(12) United States Patent
Ozaki et al.

(10) Patent No.: US 10,103,428 B2
(45) Date of Patent: Oct. 16, 2018

(54) LOW COST HIGH PERFORMANCE AIRCRAFT ANTENNA FOR ADVANCED GROUND TO AIR INTERNET SYSTEM

(71) Applicant: QUALCOMM Incorporated, San Diego, CA (US)

(72) Inventors: Ernest Tadashi Ozaki, Poway, CA (US); Mohammad Ali Tassoudji, San Diego, CA (US); Allen Minh-Triet Tran, San Diego, CA (US); Ahmad Jalali, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1057 days.

(21) Appl. No.: 14/033,351

(22) Filed: Sep. 20, 2013

(65) Prior Publication Data

US 2014/0327577 A1    Nov. 6, 2014

Related U.S. Application Data

(60) Provisional application No. 61/818,681, filed on May 2, 2013.

(51) Int. Cl.
| | | |
|---|---|---|
| *H01Q 1/28* | (2006.01) | |
| *H01Q 3/26* | (2006.01) | |
| *H01Q 25/00* | (2006.01) | |
| *H01Q 3/34* | (2006.01) | |
| *H01Q 21/00* | (2006.01) | |
| *H01Q 21/06* | (2006.01) | |

(52) U.S. Cl.
CPC ............... *H01Q 1/283* (2013.01); *H01Q 3/26* (2013.01); *H01Q 25/00* (2013.01); *H01Q 3/34* (2013.01); *H01Q 21/005* (2013.01); *H01Q 21/065* (2013.01)

(58) Field of Classification Search
CPC .......... H01Q 3/26; H01Q 1/283; H01Q 25/00; H01Q 3/34; H01Q 21/005; H01Q 21/065
USPC ......................................................... 342/367
See application file for complete search history.

(56) References Cited

U.S. PATENT DOCUMENTS

| | | | | |
|---|---|---|---|---|
| 3,725,938 | A * | 4/1973 | Black | G01S 1/02 342/434 |
| 5,619,216 | A | 4/1997 | Park | |
| 5,923,302 | A | 7/1999 | Waterman et al. | |
| 6,094,171 | A | 7/2000 | Riddle et al. | |
| 6,445,342 | B1 * | 9/2002 | Thomas | H04B 7/01 342/367 |
| 6,697,641 | B1 * | 2/2004 | Shapira | H01Q 1/246 342/361 |

(Continued)

OTHER PUBLICATIONS

PCT International Preliminary Report on Patentability, PCT/US2014/035734, dated Jun. 23, 2015.*

(Continued)

*Primary Examiner* — Frank J McGue
(74) *Attorney, Agent, or Firm* — Paradice and Li LLP/Qualcomm

(57) ABSTRACT

A high gain multi-beam aircraft blade antenna of an air-to-ground antenna systems includes multiple columnar matrix antenna elements housed within a blade. The elements are arranged to create independently steerable directed beams. A first independently steerable beam is used to provide communication. A second independently steerable beam is used to simultaneously search other signals.

28 Claims, 9 Drawing Sheets

(56) References Cited

U.S. PATENT DOCUMENTS

| | | |
|---|---|---|
| 6,774,860 B2 | 8/2004 | Downs |
| 8,145,208 B2 | 3/2012 | Chari et al. |
| 8,280,309 B2 | 10/2012 | Monk |
| 9,136,611 B2 * | 9/2015 | Mitchell ................ H01Q 1/283 |
| 2004/0180707 A1 | 9/2004 | Barrett |
| 2006/0030311 A1 | 2/2006 | Cruz et al. |
| 2006/0229077 A1 * | 10/2006 | Monk .................... H01Q 1/283 |
| | | 455/442 |
| 2008/0102814 A1 | 5/2008 | Chari et al. |
| 2012/0056784 A1 | 3/2012 | Xie et al. |
| 2012/0202430 A1 | 8/2012 | Jalali et al. |

OTHER PUBLICATIONS

International Search Report and Written Opinion—PCT/US2014/035734—ISA/EPO—dated Jan. 22, 2015.

* cited by examiner

LOW COST HIGH PERFORMANCE AIRCRAFT ANTENNA FOR ADVANCED GROUND TO AIR INTERNET SYSTEM

CROSS-REFERENCE TO RELATED APPLICATION

This application claims the benefit under 35 U.S.C. § 119(e) to U.S. Provisional Patent Application No. 61/818,681 entitled "LOW COST HIGH PERFORMANCE AIRCRAFT ANTENNA FOR ADVANCED GROUND TO AIR INTERNET SYSTEM," filed on May 2, 2013, the disclosure of which is expressly incorporated by reference herein in its entirety.

BACKGROUND

Field

Aspects of the present disclosure relate to air-to-ground communication systems, and more particularly to an air-to-ground communications system adapted for use with an airborne mobile platform that provides a low cost high performance aircraft antenna.

Background

Wireless communication networks are widely deployed to provide various communication services such as telephony, video, data, messaging, broadcasts, and so on. Such networks, which are usually multiple access networks, support communications for multiple users by sharing the available network resources. Such networks may be terrestrial-based networks. However, in recent years, publicly accessible networks are being made available for passengers on commercial air transportation, e.g., airplanes and other aircraft.

Such services may be referred to as air-to-ground (ATG) communication services, and may provide such services as broadband data, voice communication, and entertainment such as streaming movies or music. Although ATG services and networks are similar to currently deployed terrestrial cellular and other wireless networks, there are aspects of ATG networks that differ from these networks.

As aircraft fly across a geographic region, each aircraft may be serviced by a particular base transceiver station (BTS) until signal quality, signal strength, or available bandwidth from that BTS is insufficient, at which time service is transferred to another BTS. Such a transfer may be referred to a "handoff," similar to handoffs that occur in terrestrial cellular networks for cellular devices (handsets, PDAs, etc.) when such devices are mobile.

Aircraft may use a single transceiver having an antenna mounted on the undercarriage of the aircraft to communicate with the BTS. However, BTS antenna patterns are usually designed to service terrestrial customers. The beam patterns at a given BTS are usually not arranged to service ATG communications traffic.

Current generation satellite communications systems offering broadband internet service to commercial jetliners specify sophisticated high gain agile beam antennas to initiate and maintain the communications link to the satellites. These antennas may be large, complex, and expensive, and involve large surface areas and volumes on the aircraft fuselage, adding to installation costs.

Capacity for these systems is limited, and launching new satellites to accommodate capacity growth can be prohibitively expensive. Generally, these costs are passed on to the consumer in the form of higher service fees.

Merely replicating terrestrial cellular beam patterns or satellite antenna beam patterns around the aircraft in an omnidirectional pattern would provide insufficient signal strength and capacity to service the thousands of aircraft and potentially hundreds of thousands of users in such an ATG system. The omnidirectional pattern also creates interference patterns that could be deleterious to communications links in ATG systems as well as other aircraft communications systems.

As aircraft travel through a particular BTS service area, or are handed off to another BTS service area, the aircraft antenna may also change beam patterns or beam directions to provide continuous service during aircraft flight, which may not have as stringent tracking accuracy as with satellite communications links. Federal Communication Commission (FCC) rules may also prohibit certain portions of the flight from providing communications services. FCC rules may prevent transmissions in specific terrestrial directions which may not have been at issue when the transmissions were directed to higher elevations. Further, aircraft flight characteristics, and aircraft fuselage shape and antenna mounting possibilities, may make aircraft antenna design for ATG systems meeting FCC and system user specifications difficult.

SUMMARY

In an aspect of the present disclosure, a high gain multi-beam aircraft blade antenna includes multiple columnar matrix antenna elements housed within a blade. The elements are arranged to create independently steerable directed beams. A first independently steerable directed beam is for providing communication. A second independently steerable directed beam is for simultaneously searching for other signals.

In another aspect of the present disclosure, a high gain multi-beam aircraft blade antenna includes means for housing multiple columnar matrix antenna elements. The antenna further includes columnar matrix antenna means housed within the housing means. The antenna means are arranged to create independently steerable directed beams. A first independently steerable directed beam is for communication. A second independently steerable beam is for simultaneously searching for other signals.

A method of wireless communication using a high gain multi-beam aircraft blade antenna in accordance with another aspect of the present disclosure includes operating multiple columnar matrix antenna elements housed within a blade. The elements are arranged to create independently steerable directed beams. The method also includes steering a first independently steerable beam to provide communication. The method further includes steering a second independently steerable beam to simultaneously search for other signals.

In another aspect of the present disclosure, a computer program product is configured to provide wireless communication using a high gain multi-beam aircraft blade antenna. The computer program product includes a non-transitory computer-readable medium having non-transitory program code recorded thereon. The non-transitory program code includes program code to operate multiple columnar matrix antenna elements housed within a blade. The elements are arranged to create independently steerable directed beams. The program product also has program code to steer a first independently steerable directed beam to provide communication. The program product further includes program code to steer a second independently steerable directed beam to simultaneously search for other signals.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Figure 1:
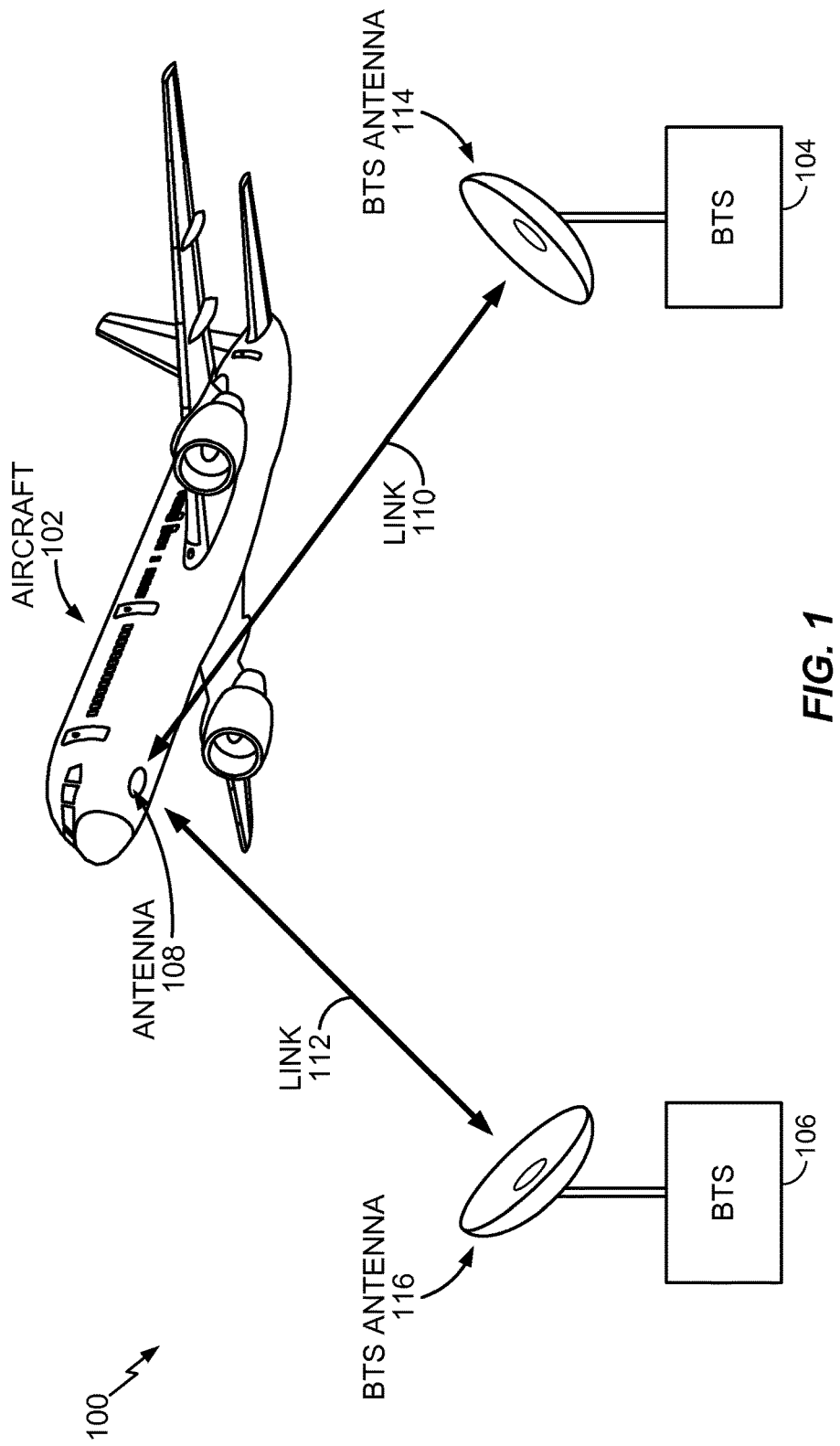
FIG. 1 illustrates a diagram of an example of an air-to-ground telecommunications system.

FIG. 1 illustrates a diagram of an example of an air-to-ground wireless system. Representatively, an air-to-ground wireless system 100 includes an aircraft 102 and multiple base transmission stations (BTS) 104-106. Although only the aircraft 102, the BTS 104 and the BTS 106 are shown for clarity, any number of aircraft, and BTS can be implemented within the scope of the present disclosure.

The aircraft 102 has an aircraft antenna 108 for communication with one or more of the BTS 104 and the BTS 106 via a communication link 110 and/or a communication link 112 via a BTS antenna 114 and/or a BTS antenna 116.

As the aircraft 102 flies overhead via a predefined route at regulated altitudes, the aircraft 102 will enter and leave the service area for the BTS 104 and/or BTS 106, as well as any other BTSs 104/106 that are in a geographically proximate area. A terrestrial cellular system may be adapted for ATG service with a wide beam width (e.g., the BTS antenna 114 and/or the BTS antenna 116) to service the aircraft 102 via the aircraft antenna 108. The wide beam width in used in an attempt to provide voice and low-speed data services to cellular telephones or other mobile devices (not shown) that are onboard the aircraft 102. Such an approach, however, may not have sufficient bandwidth or power to properly maintain the communication link 110 or the communication link 112 to service the aircraft 102 or other aircraft that are in the geographic service area for the BTS 104 and/or the BTS 106.

Figure 2:
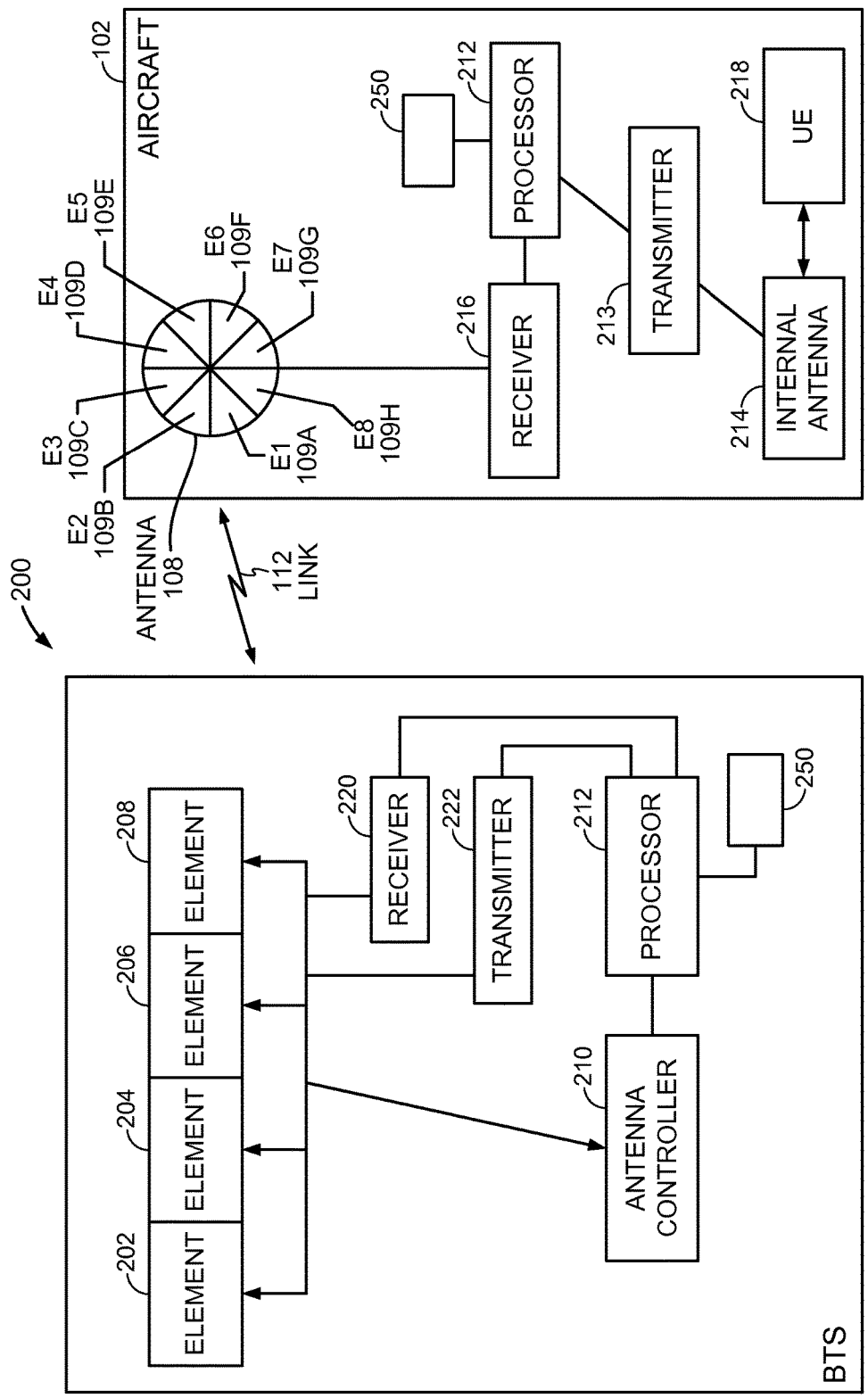
FIG. 2 illustrates a base transmitting station antenna in accordance with one or more aspects of the present disclosure.

FIG. 2 illustrates a base station transmitting antenna in accordance with one or more aspects of the present disclosure. An antenna 200 (illustrated as the BTS antenna 114 and/or the BTS antenna 116 in FIG. 1) can be a steerable beam antenna, implemented as a phased array antenna having antenna elements 202, 204, 206 and 208. Other steerable beam antennas, such as tracking antennas, are envisioned as within the scope of the present disclosure. Further, the aircraft antenna 108 may have elements E1 109A, E2 109B, E3 109C, E4 109D, E5 109E, E6 109F, E7 109G, and E8 109H, or some other number of elements, that can be a steerable antenna or a switchable antenna, without departing from the scope of the present disclosure.

The air-to-ground wireless system 100 of the present disclosure may use microwave spectrum currently used by very small aperture terminal (VSAT) uplinks, which may be in the Ku-band of frequencies at approximately 12-14 GHz, although it can also be in other frequency ranges and bands without departing from the scope of the present disclosure. To enable this spectrum reuse without degrading other uses of VSAT frequencies in other systems, e.g., maritime VSAT, other previously-deployed VSAT systems, etc., aspects of the present disclosure control the antenna patterns of the BTS antenna 114 and the BTS antenna 116, as well as the antenna pattern of the aircraft antenna 108. The antenna patterns are controlled to reduce interference between the air-to-ground wireless system 100 and VSAT systems.

To further enable the air-to-ground wireless system 100, the BTS antenna 114 and/or the BTS antenna 116 uses very narrow transmission beams, sometimes called "pencil" beams. Pencil beams may have main power lobes of the beam pattern that are on the order of 1 degree by 2 degrees for supporting spatial multiplexing gain where the VSAT spectrum is reused for multiple aircraft from each BTS 104-106. This spatial multiplexing utilizes these very well defined beams by reducing interference, also referred to as "bleed over," from one beam to any other beam within the air-to-ground wireless system 100. The BTS uses these beams to transmit communications signals to aircraft and to receiver communications signals from aircraft.

To track multiple aircraft (e.g., the aircraft 102) as they move across the field of view of the BTS antenna 114-116, each of the aircraft 102 is illuminated with a narrow pencil beam formed by the antenna elements 202-208. These beams establish the communication link 110 (or the communication link 112), and these links are maintained by an antenna controller 210. In this configuration, the antenna controller 210 controls the phase and amplitude coefficients of signals that drive each of the antenna elements 202-208 to form and manipulate the beams used for the communication link 110. The processor 212 is coupled to the antenna controller 210, the transmitter 222, and the receiver 220 at the BTS 104-106. The processor 212 may direct the formation of many beams over the communication link 110 depending on the amplitude and phase coefficients for a given signal to be transmitted or a given signal being received at the BTS 104 and/or the BTS 106. The signals contained in those beams include reference signals, which are known by both the transmitter and the receiver. The reference signals enable measurement of the signal. These reference signals are also known as pilots or pilot signals.

The processor 212 may be coupled to a memory 250, which may be a non-transitory computer-readable medium embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The aircraft 102 operates similarly, in that the communication link signals are sensed at the aircraft antenna 108 and received at the aircraft receiver 216. These signals are processed by the processor 212, which may be a similar or different processor than the processor 212 at the BTS 104 and/or the BTS 106, and then transmitted in the aircraft 102 by the transmitter 213. The internal antenna 214 transmits these signals to a user equipment 218 (UE), such as a cellular telephone, which then transmits back to the internal antenna 214. These signals are then received by the transmitter 213 and processed by the processor 212, and then retransmitted by the transmitter 213 through the aircraft antenna 108 back to the BTS 104 and/or the BTS 106.

In essence, the antenna 200 creates pencil beams through the use of the antenna 200 (e.g., a phased array) made up of antenna elements 202-208 that are energized in particular phase and amplitude configurations to follow the aircraft 102 as it moves. Mechanical stress, thermal and local scattering effects affect the communication links 110, 112. These effects also distort the beam pattern of the antenna 200, which reduces the performance of the air-to-ground wireless system 100 by increasing the power in the side lobes of the antenna beam created by the antenna 200. The beam from the antenna 200 is only fully formed and measurable at a considerable distance from the antenna 200, which may be several meters from the antenna 200 itself because of the high gain of the antenna 200 beam. Therefore, sampling the beam close to the antenna (e.g., in the near field) is problematic.

Further, atmospheric conditions between the BTS 104-106 and the aircraft antenna 108 of the aircraft 102 may affect the beam, causing it to distort or diverge from the determined path, which affects the performance of the communication link 110. The distortion or divergence effects may include beam squint, beam size distortion, or other effects, any of which reduces the bandwidth available for data/voice transmission between the BTS 104-106 and the aircraft antenna 108. The antenna 200 can compensate for these effects by adjusting the phase and amplitude of the drive to each of the antenna elements 202-208, but only when there is some ability to determine the shape of the beam formed by antenna 200 at an appropriate distance from the antenna. The aircraft antenna 108 should also be able to provide beams of sufficient gain and directional control to maintain communications with the BTS 104 and BTS 106.

In a communications system that uses a phased array antenna to provide antenna gain, the precise adjustment of the amplitude and phase coefficients is not critical if the system only employs one beam. When the communications system uses the multiple beams possible with a phased array antenna, and the beams provide spatial multiplexing to multiple users of the system, the adjustment of the coefficients becomes more important. This precise adjustment of coefficients is known as calibration of the phased array.

Figure 3:
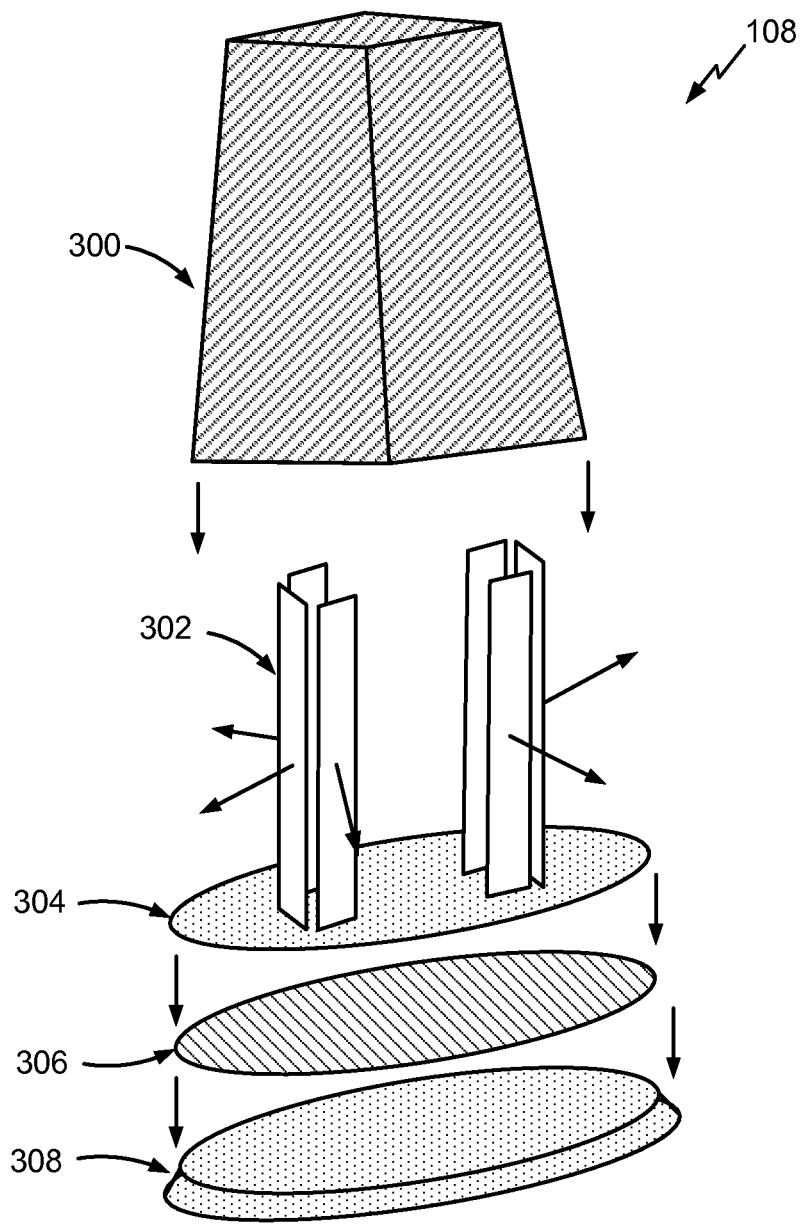
FIG. 3 illustrates a blade antenna system that may be deployed in an air-to-ground broadband communications system in accordance with aspects of the present disclosure.

FIG. 3 illustrates a blade antenna system that may be deployed in an air-to-ground broadband communications system in accordance with aspects of the present disclosure. FIG. 3 illustrates an exploded view of the aircraft antenna 108 in an aspect of the present disclosure, and shows housing 300, which may be a blade-shaped radome enclosure. The housing 300 may be a low-profile enclosure that is similarly sized and shaped to that of commercially available aircraft blade antenna housings.

The present disclosure may also include M column arrays 302 of low profile radiating elements that are designed to fit within the housing 300. The housing 300 structure and format allow for reducing the area used to install the aircraft antenna 108 to the aircraft 102 fuselage, and reduce any extension of the aircraft antenna 108 volume inside of the aircraft 102. Reduction of the use of the aircraft 102 interior volume is specified for many SATCOM based aircraft antenna solutions. One approach used in the present disclosure may increase flexibility in selecting allowable mounting locations for the aircraft antenna 108 on the aircraft 102, which may also reduce installation costs. The aircraft antenna 108 may be mounted on the belly surface of the aircraft 102 fuselage. The column arrays 302 may be arranged so that 360 degrees of azimuthal coverage and ~20 degrees of near horizon elevation coverage are obtained.

The design of each column array 302 may support the notion of un-interrupted service throughout most of the flight. This results from designing each column array 302 to provide multiple independently steerable directive antenna beams in the azimuth plane. In this configuration, one beam provides the service link, while another is simultaneously searching for other signals from ground station terminals to hand off at the appropriate time. A grouping of M of the column arrays 302 and N blade assemblies in the elements may allow for up to 360 degrees of azimuthal coverage where the values of M and N may be selected to reduce cost and installation complexities.

Figure 4C:
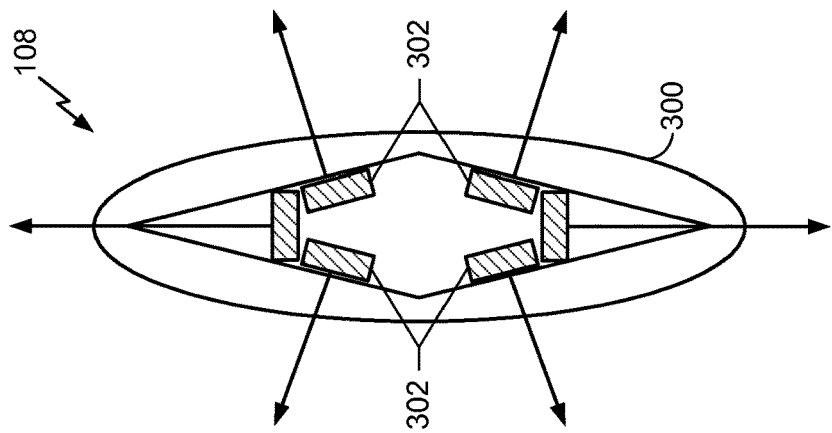
FIGS. 4A through 4D illustrate packaging aspects of an antenna in accordance with aspects of the present disclosure.
Figure 4B:
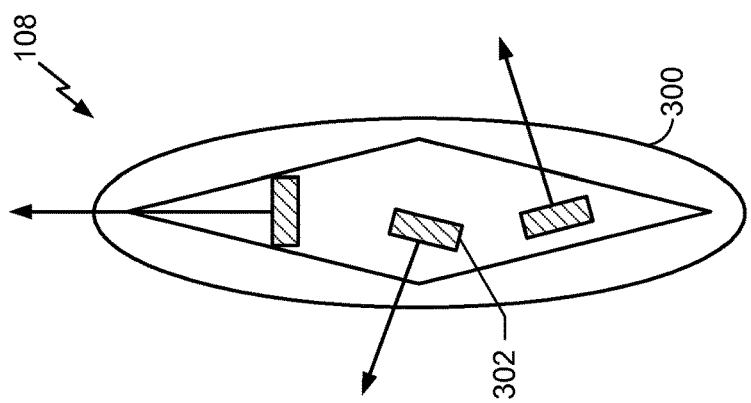
Figure 4A:
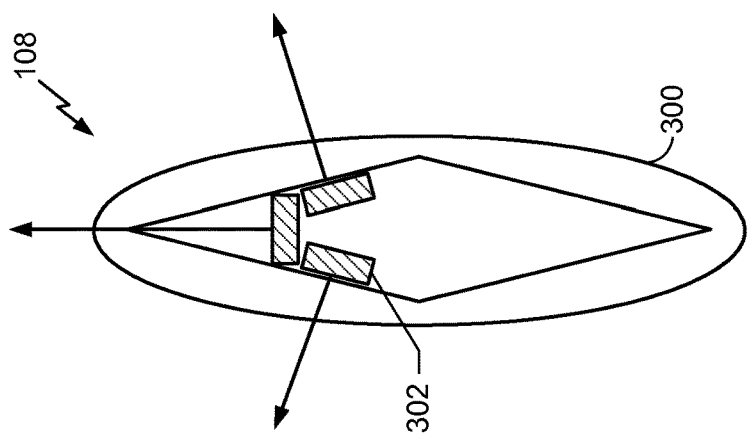

Various configurations are shown in FIGS. 4A and 4B where M=3 and N=2. In these examples, one blade aircraft antenna covers the forward looking direction while the other blade aircraft antenna is oriented towards the aft direction. A total coverage region for each blade is approximately 210 degrees in azimuth because each column array 302 is designed to scan +/−35 degrees from its bore sight direction. Hence two blades may cover the desired 360 degrees. The 210 degree window accounts for coverage when the line of sight to one of the blades is blocked by aircraft engine nacelles that may be used by large commercial aircraft. In cases where the blockage does not exist (e.g. planes with tail-mounted engines), FIG. 4C may illustrate an appropriate configuration for the aircraft antenna 108.

The relatively high gain directional antenna beams afforded by one aspect of the present disclosure allow the communications links between the aircraft 102 and the BTS 104 to be closed at longer distances than links made with lower gain omnidirectional-type antennas often used for air to ground communications. This approach of the present disclosure reduces the number of BTS 104 sites used to support the aircraft communications, which in turn, reduces the overall system costs.

The column arrays 302 are supported by an interface plate 304 that is coupled to a beam forming/steering unit 306 containing electronics that provide for the multiple independently scanned antenna beams. The beams may be used in a way that provides seamless hand off between the BTS 104 and the BTS 106 coming into and out of range of the aircraft 102. An additional benefit of directive beams compared to the omnidirectional-coverage beams that may be prevalent in today's blade antenna technologies is that the beam patterns illuminate less of the surrounding structure of the aircraft (wings, engines, etc.). The smaller illumination helps to reduce the unwanted scattering and reflections that can degrade the aircraft antenna gain. Gain ripples caused by these effects can be several dBs which can lead to excessive call drops and interrupted service. The aircraft antenna 108 is coupled to the aircraft 102 using a fuselage adapter plate 308, which may have different curvatures depending on the location where the aircraft antenna 108 is mounted on the aircraft 102.

FIG. 4A shows the aircraft antenna 108 of FIG. 3 from a top view, where three column arrays 302 are provided in a hexagonal arrangement. This allows for a combination of beams between the column arrays 302, but may result in an increased width of the housing 300. In an aspect of the present disclosure, two of these aircraft antennas 108 may be placed on the aircraft: one for aft aircraft antenna coverage and one for forward aircraft antenna coverage. The aircraft antenna 108 shown in FIG. 4A may have a 210 degree coverage in azimuth, and the angle of azimuthal coverage from the aircraft antenna 108 may be reduced or increased.

FIG. 4B shows the aircraft antenna 108 of FIG. 3 with three column arrays 302 in a staggered arrangement. The column array beam combinations may not be possible with only one of these aircraft antennas 108 on an aircraft 102. The housing width may be smaller, which may allow for additional antennas to be installed on the aircraft 102. The aircraft antenna 108 shown in FIG. 4B may have a 210 degree coverage in azimuth, and the angle of azimuthal coverage from the aircraft antenna 108 may be reduced or increased as desired.

FIG. 4C shows the aircraft antenna 108 of FIG. 3 with two sets of three column arrays 302 in a hexagonal arrangement. The column arrays 302 may be combined with only one of these aircraft antennas 108 on an aircraft 102, and still allow for up to 360 degree coverage on the aircraft 102. The aircraft antenna 108 shown in FIG. 4C may be mounted on aircraft 102 that have little horizontal blockage, such as the aircraft 102 with tail mounted engine nacelles. The aircraft antenna 108 shown in FIG. 4C also may be electronically controlled or mechanically designed to have antenna beam coverage avoid blockage areas as well as to reduce scattering from the aircraft surfaces.

Figure 4D:
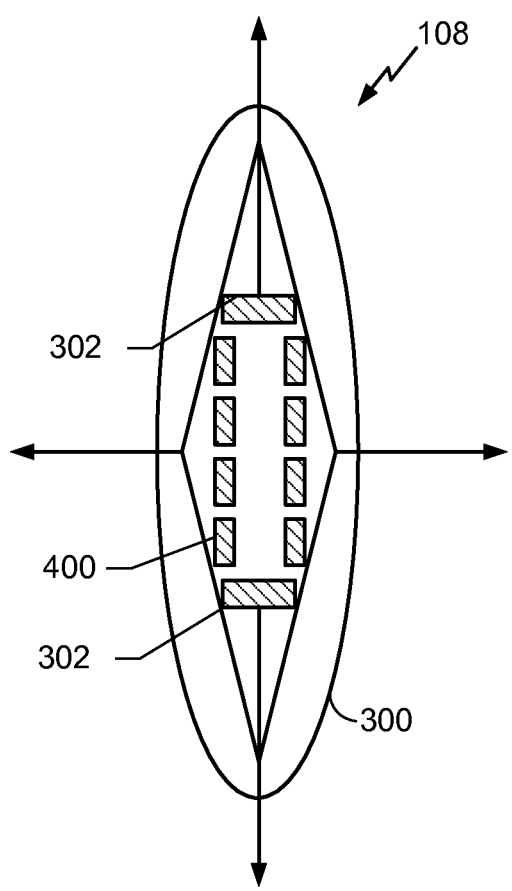

FIG. 4D shows the aircraft antenna 108 of FIG. 3 with two sets of four column arrays 400 according to a further aspect of the present disclosure. In this configuration, the two sets of four column arrays 400 may be slot elements or patch elements, mounted facing port and starboard faces of the housing 300 blade, respectively. The column arrays 302 in the fore and aft direction may still be two by twelve (2×12) patch arrays with steerable beams in the azimuth and elevation planes. The column arrays 400, which may be in a four by twelve (4×12) arrangement, allow for 3 dB higher gain because the aperture of the column array is twice as large.

This aspect of the present disclosure uses less beam steering in the elevation plane as specified by the fore and aft column arrays 302 to provide a specified gain for the aircraft antenna 108, which may be above 15 dBi. The configuration shown in FIG. 4D may use a beam pattern in the elevation plane that has a fixed flat top shape, which involves less scanning. The configuration shown in FIG. 4D exhibits similar performance to the other configurations shown in FIGS. 4A through 4C. Beam steering of the antenna shown in FIG. 4D may only occur in the azimuth plane, which in turn allows for only four sets of active beam steering electronics. This may reduce cost and complexity of the aircraft antenna 108 in comparison to other configurations of the present disclosure. Further, the configuration shown in FIG. 4D may be narrower than other configurations of the present disclosure, which may be desired in certain applications. Although four columns are shown and described, other numbers of columns are also contemplated.

Figure 5:
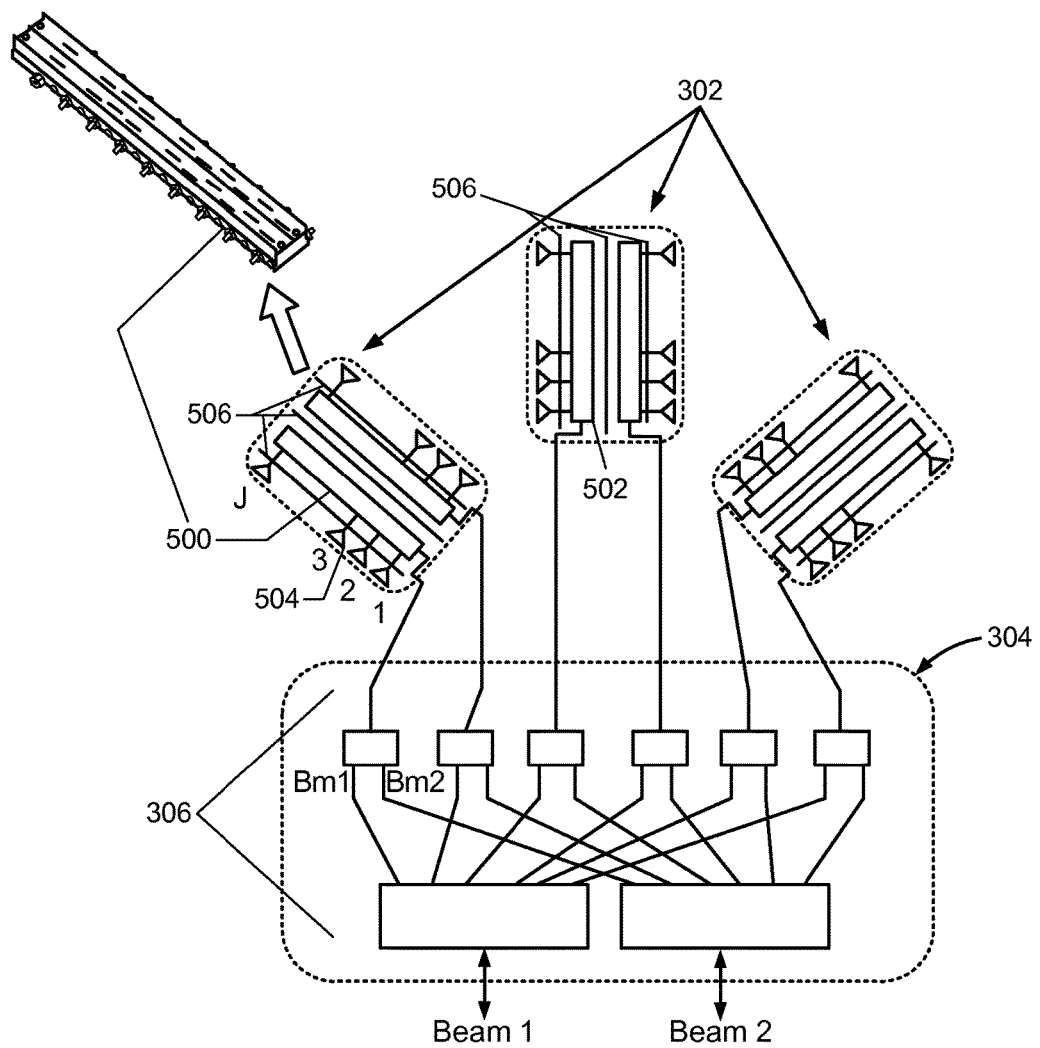
FIG. 5 illustrates a slot array antenna with azimuth plane beam steering in accordance with an aspect of the present disclosure.
Figure 6:
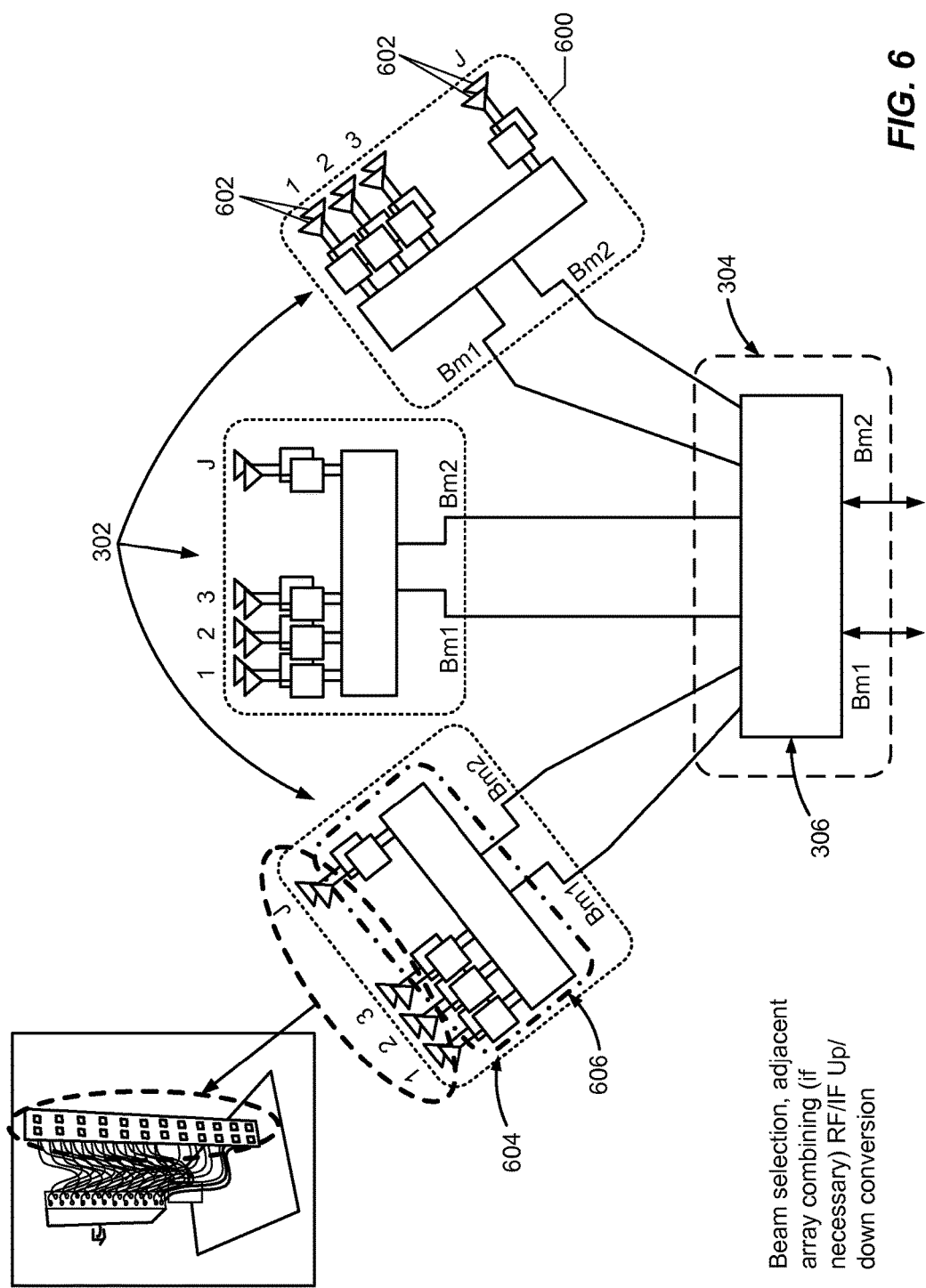
FIG. 6 illustrates a slot array antenna with azimuth and elevation plane beam steering in accordance with one aspect of the disclosure.
Figure 7:
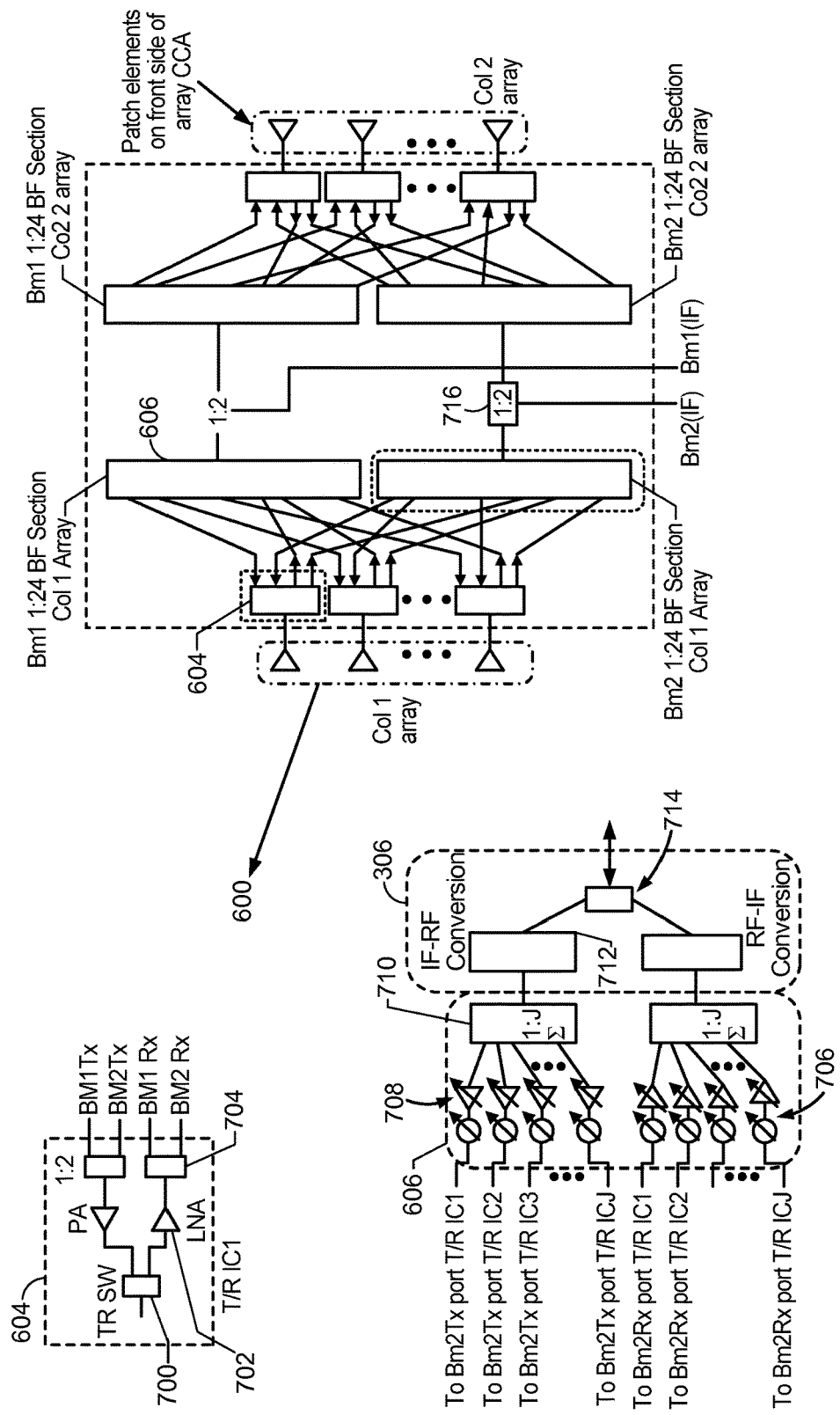
FIG. 7 illustrates additional details of the electronics for a patch array antenna in accordance with an aspect of the present disclosure.

Additional aspects of the present disclosure are illustrated in FIGS. 5, 6, and 7. FIG. 5 illustrates an aircraft antenna in the configuration shown in FIG. 4A. Column arrays 302 may be implemented as lengths of a ridged waveguide transmission line configuration that is fed at one end 502. By feeding the transmission line 500 at one end, the slots 504 in the cover plate of the waveguide, which may be any number of slots 504, are excited. There may be J number of slots 504, and J may be any number, but is often between four and twenty and more often between eight and twelve.

The traveling wave in the transmission line 500 (also referred to as a waveguide) couples to the individual ones of the slots 504 as the wave travels down the transmission line 500. Each slot 504 then radiates energy from the transmission line 500 away from column array 302, and effectively forms a linear array of J slot elements in the transmission line 500. The coupling level between the transmission line 500 to the individual ones of the slots 504, and the slot locations, may be adjusted so the resultant radiated beam shape provides uniform aircraft antenna gain over a prescribed range of elevation plane angles. The aircraft antenna gain may have any beam shape in the desired elevation plane field of view, such as a flat top beam shape. Without this manner of beam shaping for aircraft antenna, the beam width in the elevation plane might be too small to cover the desired field of view (FOV), which may be twenty degrees. Electronic beam scanning might be used in the elevation plane to make up for the inability of other antennas that do not have such a beam shape, which might add to the cost and complexity of the aircraft antenna system. A pair of these transmission lines 500, embodied as slotted waveguide antennas, form a single column array assembly.

An aspect of the present disclosure may have three of these column array assemblies for each blade, with each pointed at 60 degree increments in azimuth (See FIGS. 4A and 4B). Two such column arrays 302 designed for Ku band frequencies can be packaged side by side with a width less than one inch wide and less than eight inches tall making it suitable for installation in an aircraft blade enclosure. Each transmission line 500 of the 2×J assembly may be fed with a simple feed using RF or digital weighting to form a pair of independently scannable beams in the azimuth plane with a fixed angular coverage in the elevation plane. The beam forming/steering unit 306 may be packaged on the interface plate 304 from which the waveguide column arrays are mounted, or elsewhere as desired. Use of a waveguide type feed approach allows for shaped beamforming with extremely low beamforming loss in comparison to other techniques using printed micro strip or strip line media. This helps reduce or even minimize the column height for a given peak gain specification. Antenna vanes 506 may optionally be placed between the columns of the transmission lines 500 to reduce interference, cross-correlation, or other interactions between the transmission lines 500 in a column array 302. Further, antenna vanes 506 may optionally be placed on or near the outer edges of the transmission lines 500 to assist in isolating the transmission lines 500 from other column arrays 302 within the system 100.

Another aspect of the present disclosure is shown in FIG. 6. This aspect utilizes patch antenna elements in an array 600 instead of individual ones of the transmission lines 500 placed parallel to each other as the column arrays 302. The patch antenna elements 602 may be in a column by row array, where there may be J number of patch antenna elements 602 and K rows of the patch antenna elements 602. J and K may be any number, but J is often between four and twenty and more often between eight and twelve, and K is often between two and ten. The overall size and shape of the array 600 is similar to that of the aircraft antenna shown in FIG. 5. Thus, the housing 300 may be of a similar shape for either aspect of the present disclosure.

Each array 600 of the patch antenna elements 602 is directly connected to RF integrated circuits (RFICs) 604. The RFICs 604 may provide for pre-amplification at the element level in order to negate the effect of circuit losses of the beamforming and steering components. Additionally, the RFICs 604, or other elements 606, may provide the amplitude and phase weighting for each of the patch antenna elements 602 that provides beam steering and shaping capability in both azimuth and elevation planes for array 600. The capability to steer beams in the elevation plane and use of element level RFICs may allow for improvement in peak antenna gain compared to that of other aspects of the present disclosure. The beam forming/steering unit 306 may provide beam selection, adjacent array combination as desired, and any up conversion or down conversion of signals used to communicate using aircraft antenna 108.

Another aspect of the present disclosure is shown in FIG. 7. FIG. 7 illustrates additional details of a block diagram used to implement the aspect shown in FIG. 6. Other elements, devices, or approaches may be used without departing from the teachings of the present disclosure.

The RFIC 604 is shown as comprising a transmit/receive switch 700, coupled to power amplifiers 702 which are coupled to signal splitters 704. This arrangement enables a single one of the patch antenna elements 602 to transmit and receive signals from two different beams in a substantially simultaneous fashion. Additional ones of the power amplifiers 702 and signal splitters 704 may be used to create additional signal paths through the patch antenna element 602, as desired.

One of the other elements 606 is also shown in further detail. The element 606 may include digital phase shifters, a receive digital phase shifter 706 and a transmit digital phase shifter 708, which are coupled to the patch antenna elements 602 and to the signal combiner 710, which is coupled to the beam forming/steering unit 306. A frequency converter 712, as part of the beam forming/steering unit 306, up- and down-converts the signals for the aircraft antenna. The frequency converter 712 is coupled to a transmit/receive switch 714 to control the transmission and reception of the aircraft antenna 108. The transmit/receive switch 714 is coupled to signal splitters 716 to couple the columns of the patch antenna elements 602 together for beamforming and beam steering, as desired.

Other potential benefits afforded by elevation plane pattern control include being able to dynamically adjust the elevation plane pattern shape (narrow or lower gain wide angle coverage). Another benefit is the ability to execute pattern nulling to protect against interferers or prevent jamming, and pattern shaping to avoid local scattering from the aircraft fuselage. A main disadvantage is increased cost of the beamforming electronics that likely involve custom integrated circuits (ICs) to fit on the back of the patch array aperture substrates.

In one configuration of the present disclosure, a high gain multi-beam aircraft blade antenna includes means for housing multiple columnar matrix antenna elements. Housing means may be the housing 300, or other means configured to perform the functions recited by the housing means. In this configuration, the antenna also includes antenna means arranged to create multiple independently steerable directed beams. At least a first independently steerable beam is for communication. At least a second independently steerable beam is for simultaneously searching for other signals. In one aspect of the disclosure, the antenna means may be the column arrays 302, the transmission lines 500, the patch antenna elements 602, or other means configured to perform the functions recited by the antenna means. In another aspect, the aforementioned means may be any module or any apparatus configured to perform the functions recited by the aforementioned means.

Figure 8:
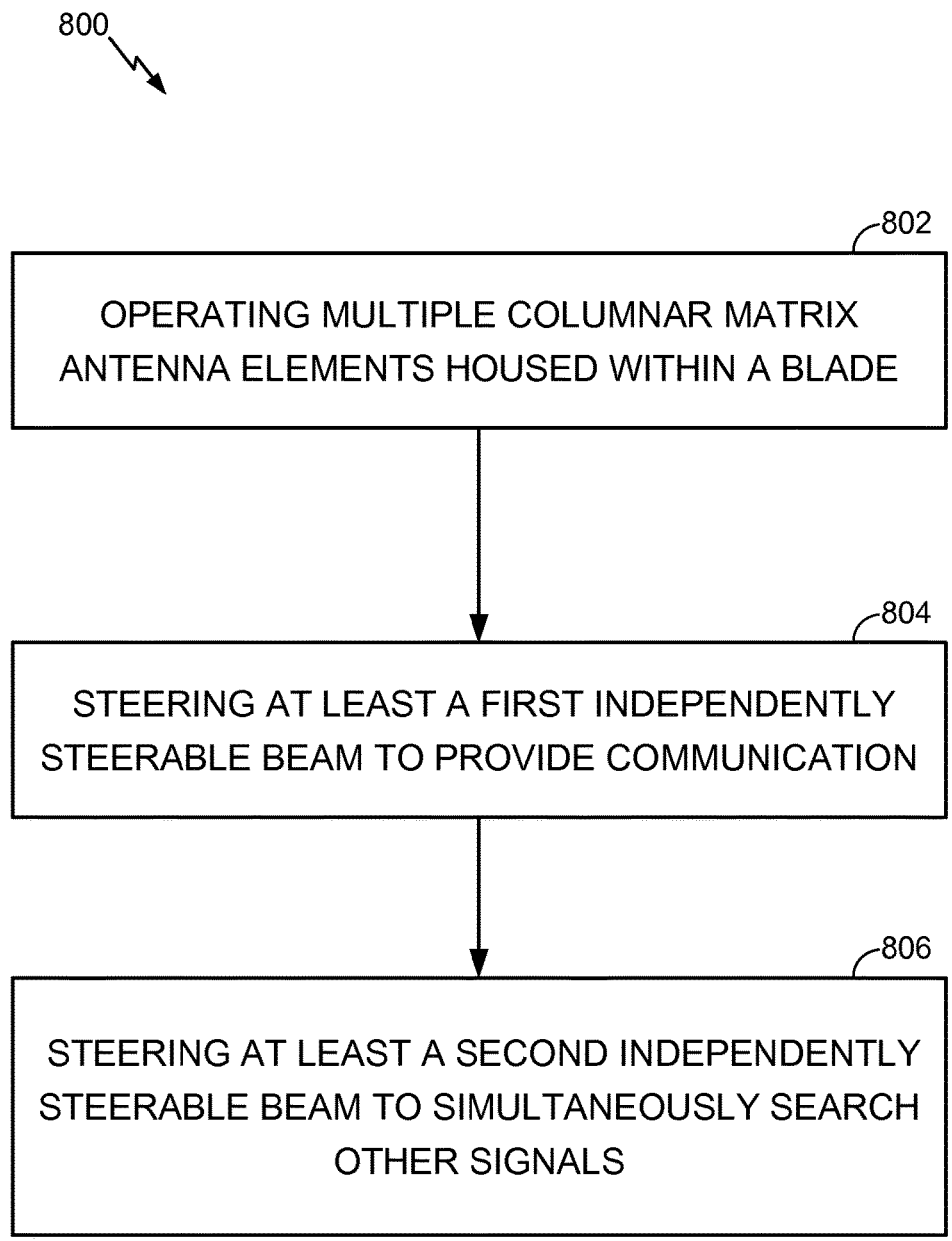
FIG. 8 illustrates a process in accordance with an aspect of the present disclosure.

FIG. 8 illustrates a process in accordance with an aspect of the present disclosure. Representatively, a flow chart 800 illustrates a method for wireless communication using high gain multi-beam aircraft blade antenna. In block 802, multiple columnar matrix antenna elements housed within a blade are operated. In block 804, at least a first independently steerable beam is steered for communication. At block 806, at least a second independently steerable beam is steered to simultaneously search for other signals.

A non-transitory computer-readable medium in accordance with an aspect of the present disclosure may be memory 250 or other devices or elements used to perform the functions of the computer-readable medium. The non-transitory computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

A computer program product in accordance with an aspect of the present disclosure is configured for wireless communication within a communications system using a low profile conformal high gain multi-beam aircraft antenna. The computer program product includes a non-transitory computer-readable medium having non-transitory program code recorded thereon. The non-transitory program code includes program code for creating a gain pattern near a plane of multiple antenna elements supported by a ground plane of the low profile conformal high gain multi-beam aircraft antenna. In this configuration, at least one of the of antenna elements includes a feeding waveguide flared in at least one of an h-plane and a v-plane. In this configuration, the antenna elements cooperating to create the gain pattern near a plane of the antenna.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A high gain multi-beam aircraft blade antenna comprising:
   a plurality of columnar matrix antenna elements arranged to create a plurality of independently steerable directional beams, wherein at least a first independently steerable beam is configured to provide communication, and at least a second independently steerable beam is configured to simultaneously search for other signals;
   a beam steering unit coupled to each of the columnar matrix antenna elements and configured to cause at least two of the columnar matrix antenna elements to transmit both of the first and second independently steerable beams simultaneously; and
   a plurality of pre-amplification circuits coupled between the columnar matrix antenna elements and the beam steering unit, at least two of the plurality of pre-amplification circuits coupled to different ones of the columnar matrix antenna elements and each of the pre-amplification circuits comprising a plurality of amplifiers, wherein:
      at least a first one of the plurality of amplifiers is configured to amplify transmission of the first independently steerable beam via at least one of the plurality of the columnar matrix antenna elements; and
      at least a second one of the of amplifiers is configured to receive signals from the at least one of the columnar matrix antenna elements.

2. The high gain multi-beam aircraft blade antenna of claim 1, wherein the plurality of columnar matrix antenna elements comprises an array of slot waveguides.

3. The high gain multi-beam aircraft blade antenna of claim 2, further comprising:
   an antenna vane placed between each of the slot waveguides.

4. The high gain multi-beam aircraft blade antenna of claim 2, wherein the slot waveguide array is scanned in azimuth of at least one of the plurality of independently steerable directed beams.

5. The high gain multi-beam aircraft blade antenna of claim 1, wherein the plurality of columnar matrix antenna elements comprises a patch array.

6. The high gain multi-beam aircraft blade antenna of claim 5, wherein the patch array is scanned in azimuth and elevation of at least one of the plurality of independently steerable directed beams.

7. The high gain multi-beam aircraft blade antenna of claim 5, wherein the patch array is configured to shape a desired gain pattern in an elevation plane of at least one of the plurality of independently steerable directed beams.

8. The high gain multi-beam aircraft blade antenna of claim 5, further comprising a transceiver coupled to each of the plurality of columnar matrix antenna elements and configured to enable simultaneous access to the plurality of columnar matrix antenna elements.

9. The high gain multi-beam aircraft blade antenna of claim 1, wherein the plurality of columnar matrix antenna elements structurally cooperate to create a desired gain pattern in a yaw direction of an aircraft while reducing deleterious scattering interference from a surface of the aircraft.

10. The high gain multi-beam aircraft blade antenna of claim 1, wherein the plurality of amplifiers comprise a first amplifier configured to amplify transmission of both of the first and second independently steerable beam and a second amplifier configured to amplify reception of both of the first and second independently steerable beam.

11. The high gain multi-beam aircraft blade antenna of claim 1, wherein each of the plurality of amplifiers is configured to amplify only one of transmission or reception of the first and second independently steerable beams.

12. The high gain multi-beam aircraft blade antenna of claim 1, wherein the at least a first one of the plurality of amplifiers is a power amplifier and at least a second one of the plurality of amplifiers is a low noise amplifier.

13. The high gain multi-beam aircraft blade antenna of claim 1, wherein the power amplifier and the low noise amplifier are both coupled to at least one transmit/receive switch.

14. The high gain multi-beam aircraft blade antenna of claim 1, wherein the first and second independently steerable beams are phase shifted beams.

15. A high gain multi-beam aircraft blade antenna comprising:
   means for housing a plurality of columnar matrix antenna elements arranged to create a plurality of independently steerable directional beams, wherein at least a first independently steerable beam is configured to provide communication, and at least a second independently steerable beam is configured to simultaneously search other signals;
   means for causing at least two of the columnar matrix antenna elements to transmit both of the first and second independently steerable beams simultaneously;
   means for amplifying transmission of the first independently steerable beam via at least one of the plurality of the columnar matrix antenna elements; and
   means for receiving signals from the at least one of the columnar matrix antenna elements.

16. The high gain multi-beam aircraft blade antenna of claim 15, wherein the plurality of columnar matrix antenna elements comprises an array of slot waveguides.

17. The high gain multi-beam aircraft blade antenna of claim 16, further comprising:
   an antenna vane placed between each of the slot waveguides.

18. The high gain multi-beam aircraft blade antenna of claim 17, wherein the slot waveguide array is scanned in azimuth of at least one of the plurality of independently steerable directed beams.

19. The high gain multi-beam aircraft blade antenna of claim 15, wherein the plurality of columnar matrix antenna elements comprises a patch array.

20. The high gain multi-beam aircraft blade antenna of claim 19, wherein the patch array is scanned in azimuth and elevation of at least one of the plurality of independently steerable directed beams.

21. The high gain multi-beam aircraft blade antenna of claim 19, wherein the patch array is configured to shape a desired gain pattern in an elevation plane of at least one of the plurality of independently steerable directed beams.

22. The high gain multi-beam aircraft blade antenna of claim 19, further comprising:
   means for enabling simultaneous access to the plurality of columnar matrix antenna elements.

23. The high gain multi-beam aircraft blade antenna of claim 19, wherein the plurality of columnar matrix antenna elements comprises two sets of a plurality of columns arranged to face port and starboard faces of the means for housing.

24. A method of wireless communication using a high gain multi-beam aircraft blade antenna, the method comprising:
   operating a plurality of columnar matrix antenna elements;
   steering at least a first independently steerable directional beam to provide communication;
   steering at least a second independently steerable directed beam to simultaneously search other signals while the first independently steerable directional beam is providing communication;
   feeding, using a beam steering unit, each of the columnar matrix antenna elements to cause at least two of the columnar matrix antenna elements to transmit both of the first and second independently steerable beams simultaneously;
   amplifying, using a first amplifier, transmission of the first independently steerable beam via at least one of the plurality of the columnar matrix antenna elements; and
   receiving, using a second amplifier, signals from the at least one of the columnar matrix antenna elements.

25. The method of claim 24, wherein the plurality of columnar matrix antenna elements comprises an array of slot waveguides.

26. The method of claim 25, further comprising:
   scanning the slot waveguide array in azimuth of at least one of the first and second independently steerable directed beams.

27. The method of claim 24, wherein the plurality of columnar matrix antenna elements comprises a patch array.

28. The method of claim 27, further comprising:
   scanning the patch array in azimuth and elevation of at least one of the first and second independently steerable directed beams.

* * * * *